US007149750B2

(12) United States Patent
Chadwick

(10) Patent No.: US 7,149,750 B2
(45) Date of Patent: Dec. 12, 2006

(54) METHOD, SYSTEM AND PROGRAM PRODUCT FOR EXTRACTING ESSENCE FROM A MULTIMEDIA FILE RECEIVED IN A FIRST FORMAT, CREATING A METADATA FILE IN A SECOND FILE FORMAT AND USING A UNIQUE IDENTIFIER ASSIGNED TO THE ESSENCE TO ACCESS THE ESSENCE AND METADATA FILE

(75) Inventor: Henry Dexter Chadwick, Herndon, VA (US)

(73) Assignee: International Business Machines Corporation, Armonk, NY (US)

( * ) Notice: Subject to any disclaimer, the term of this patent is extended or adjusted under 35 U.S.C. 154(b) by 223 days.

(21) Appl. No.: 10/027,562

(22) Filed: Dec. 19, 2001

(65) Prior Publication Data

US 2003/0115219 A1    Jun. 19, 2003

(51) Int. Cl.
G06F 17/00 (2006.01)
(52) U.S. Cl. .................................. 707/103 R; 707/102
(58) Field of Classification Search .................... 707/1, 707/100, 102, 103 R
See application file for complete search history.

(56) References Cited

U.S. PATENT DOCUMENTS

| 5,129,082 | A | 7/1992 | Tirfing et al. | |
|---|---|---|---|---|
| 5,497,491 | A | 3/1996 | Mitchell et al. | |
| 5,893,108 | A | 4/1999 | Srinivasan et al. | |
| 6,023,578 | A | 2/2000 | Birsan et al. | |
| 6,078,925 | A | 6/2000 | Anderson et al. | |
| 6,498,897 | B1 * | 12/2002 | Nelson et al. | 386/125 |
| 2002/0035732 | A1 * | 3/2002 | Zetts | 725/148 |
| 2002/0048450 | A1 * | 4/2002 | Zetts | 386/95 |
| 2002/0056126 | A1 * | 5/2002 | Srikantan et al. | 725/87 |
| 2002/0116392 | A1 * | 8/2002 | McGrath et al. | 707/104.1 |
| 2002/0164149 | A1 * | 11/2002 | Wilkinson | 386/46 |
| 2003/0085997 | A1 * | 5/2003 | Takagi et al. | 348/143 |

FOREIGN PATENT DOCUMENTS

GB    2 371 889 A  *  8/2002
JP         7175730        3/1996

OTHER PUBLICATIONS

Musick et al, "Report on the Second IEEE Metadata Conference (Metadata '97)", ACM SIGMOD Record, vol. 27, Issue 1, Mar. 1998, 5 pages.*
Baldonado et al, "Metadata for Digital Libraries: Architecture and Design Rationale", ACM 1997, pp. 47-56.*
Sanz et al, "Gathering Metadata from Web-Based Repositories of Historical Publications", Database and Expert Systems Applications, 1998, Proceedings, Ninth International Workshop on, Aug. 26-28, 1998, pp. 473-478.*

(Continued)

Primary Examiner—Uyen Le
(74) Attorney, Agent, or Firm—David W. Victor; Konrad Raynes & Victor LLP

(57) ABSTRACT

Provided is a method, system, and program for storing data in a data store, a first file in a first file format is received including essence, metadata objects providing information on the essence, and a unique identifier assigned to the essence. The essence is extracted from the file and stored in the data store. The metadata is extracted from each metadata object in the first file and stored in the data store in a second file format. The extracted metadata and essence in the data store are accessible using the unique identifier assigned to the essence.

33 Claims, 8 Drawing Sheets

OTHER PUBLICATIONS

Dolin, R.H., L., Alschuler, P.V. Biron, L.M. Fuller, A.H. Kim, W.T. Minkler, D. Onaga, and J.E. Mattison. "Clinical Practice Guidelines on the Internet: A Structured, Scalable Approach," *M.D. Computing*, vol. 16, No. 2, Mar.-Apr. 1999, pp. 60-64. (*Abstract*), one sheet only.

"Dynamic Data Binding with XML,", *EXE*, © 2000 IEE, vol. 15, No. 2, Jul. 2000, pp. 24-28. (*Abstract*), one sheet only.

Eisenzopf, Jonathan. "Making Headlines with RSS: using Rich Site Summaries to Draw New Visitors".[Internet] © 2002 CMP Media LLC. [Retrieved on Dec. 13, 2002]. Retrieved from the Internet at <URL: http://www.webtechniques.com/archives/2000/02/eisenzopf/>.

Fallside, David C. (ed.) "XML Schema Part 0: Primer", © 2000 W32, Working Draft, Sep. 29, 2000.

Hunter, Jane (ed). "DDL Working Draft 4.0" *Systems Sub-group*. International Organization for Standardization, Jul. 2000.

Liu, Ling, Calton Pu. and Wei Han. "XWRAP: An XML-enabled Wrapper Construction System for Web Information Sources" *Internatioanl Conference on Data Engineering (ICDE)*, (2000), pp. 611-621. <URL: http://citeseer.nj.nec.com/liu00xwrap.html>.

Mamas, E. and K. Kontogiannis. "Towards Portable Source Code Representations Using XML". *Seventh Working Conference on Reverse Engineering (WCRE'00)*. Nov. 23-25, 2000.

Martinez, Jose M (ed.). "Overview of the MPEG-7 Standard". [online]. International Organisation for Standardisation. Version 5.0. Mar. 2001. [Retrieved on Sep. 22, 2001]. Retrieved from the Internet at >URL: http://www.darmstadt.gmd.de/mobile/MPEG7?w4031mpeg7overview.htm>.

Morgan, Cliff. "Journals Metadata: Information About Content", *Learned Publishing*, vol. 12, No. 3, Jul. 1999. pp. 191-195.

Oltmans, Erik. "Metadata Interoperability", © 2001 Telematica Instituut, Version 1.0, Jan. 21, 2001, pp. 1-29.

Pro-MPEG/AAF Association. "Material Exchange Format (MXF): Body Container for DV DIF Packets (Standard)", Proposed SMTPE Standard. Version 7b. Jul. 30, 2001. pp. 1-14.

Pro-MPEG/AAF Association. "Material Exchange Format (MXF); Descriptive Metadata- Geneva Scheme (Standard, Dynamic)". Proposed SMTPE Standard. Version 7b. Jul. 30, 2001, pp. 1-33.

Pro-MPEG/AAF Association. "Material Exchange Format (MXF): Engineering Guideline (Informative)". Proposed SMTPE Standard. Version 7b. Jul. 30, 2001. pp. 1-39.

Pro-MPEG/AAF Association. "Material Exchange Format (MXF): Format Specification (Standard)", Proposed SMTPE Standard. Version 7b. Jul. 30, 2001. pp. 1-64.

Pro-MPEG/AAF Association. "Material Exchange Format (MXF): Mapping Type D10 Stream Data to the MXF Generic Container (Recommended Practice)", Proposed SMTPE Standard. Version 7b. Jul. 30, 2001. pp. 1-7.

Pro-MPEG/AAF Association. "Material Exchange Format (MXF): MXF Generic Container Format (Standard)", Proposed SMTPE Standard. Version 7b. Jul. 30, 2001. pp. 1-14.

Pro-MPEG/AAF Association. "Material Exchange Format (MXF): Operational Pattern 1a (Single Container, Single Item) (Standard)", Proposed SMTPE Standard. Version 7b. Jul. 30, 2001. pp. 1-64.

Pro-MPEG. "File-Interchange Working Group FAQ". Version 1e, Jun. 7, 2000. pp. 1-4.

Society of Motion Picture and Television Engineers, The. "Metadata Dictionary Registry of Metadata Element Descriptions", © 2001. RP210A-2000 (approved Aug. 24, 2000), 2 sheets.

U.S. Appl. No. 08/949,868, filed on Oct. 14, 1997, entitled "Method and System for Transferring Multimedia Content and its Associated Metadata", invented by X. E. Troche, D. Wolfe, and R. Verburg et al.

Wilkenson, Jim. "MXF File Format Update". Pro-MPEG Forum. © Sony Broadcast & Professional R&D, Dec. 19, 2002. pp. 1-34.

Zwaneveld, Eddy. "Draft: Media Exchange Format (MXF) summary- Metadata Discussion". [online] Feb. 21, 2000 [Retrieved on Sep. 22, 2001]. Retrieved from the Internet at <URL: http://palimpsest.stanford.edu/byform/mailing-lists/amia-1/2000/02/msg00215.html>.

\* cited by examiner

MXF File

KLV Metadata Object

XML Schema

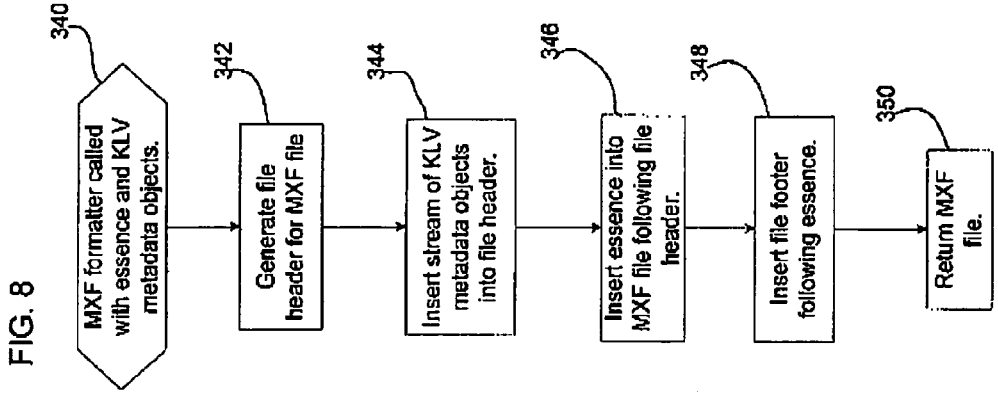
FIG. 8
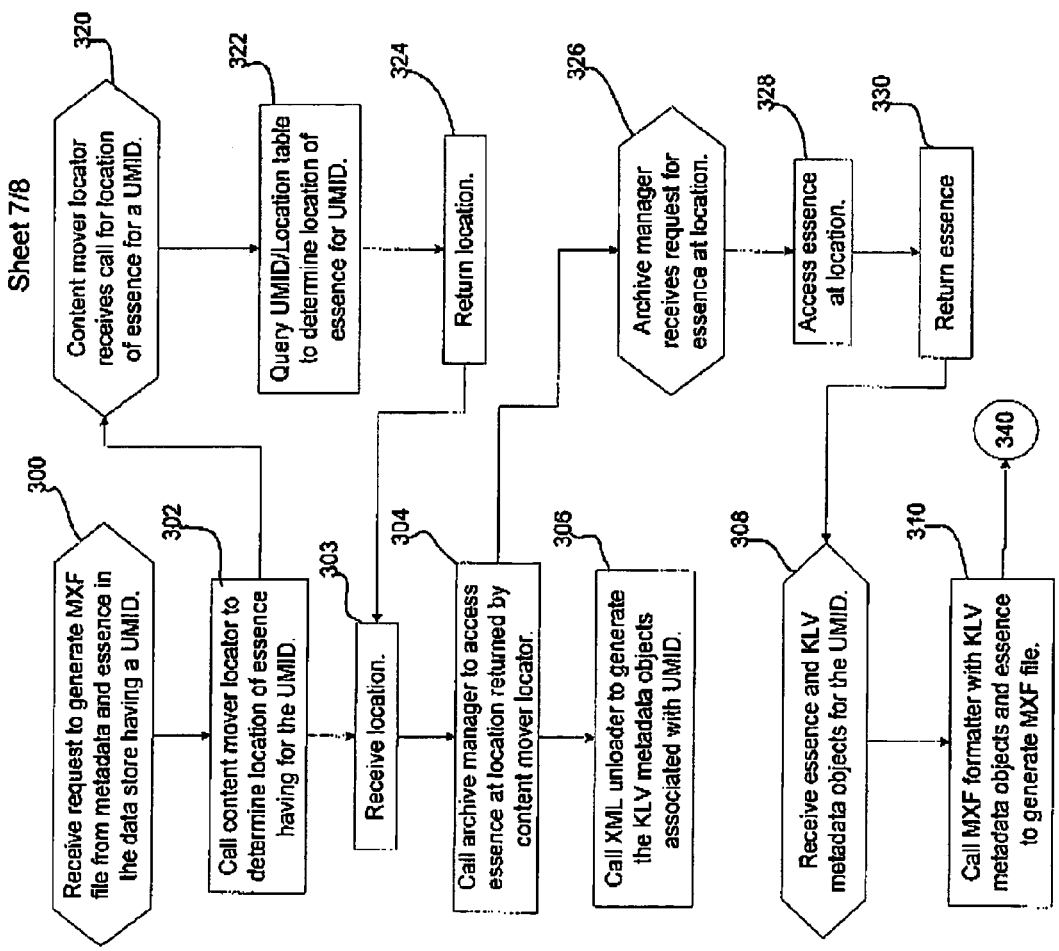

METHOD, SYSTEM AND PROGRAM PRODUCT FOR EXTRACTING ESSENCE FROM A MULTIMEDIA FILE RECEIVED IN A FIRST FORMAT, CREATING A METADATA FILE IN A SECOND FILE FORMAT AND USING A UNIQUE IDENTIFIER ASSIGNED TO THE ESSENCE TO ACCESS THE ESSENCE AND METADATA FILE

BACKGROUND OF THE INVENTION

1. Field of the Invention

The present invention relates to a method, system, and program for storing data in a data store.

2. Description of the Related Art

Current standards are being developed to provide a framework for storing digital video content. One such framework proposed by the Society of Motion Picture and Television Engineers (SMPTE) is the Media Exchange Format (MXF) that provides an architecture for exchanging digital video content as a file. An MXF file has a file header that includes metadata providing information on the video content, also referred to as the "essence", that follows the file header. A footer terminates the file. The MXF metadata is comprised of a plurality of objects that are encoded using the Key, Length, Value (KLV) coding scheme. Each KLV object includes a key which is a label that identifies the content of the value, a length field indicating the length of the value of the key, and the value itself. For instance, if the key indicates an actor's name, then the length would be the number of characters, including blank spaces, in the actors name, and the value is the actor's name. The KLV metadata objects provide information on the essence in the file through a set of attributes that describe the content in terms of author, quality, production time, developer, participants (e.g., actors, director, etc.), format, etc. The metadata in the file header thus provides a technique for identifying the video content (essence) without the need to render the actual essence. The SMPTE provides a KLV Metadata Dictionary having numerous unique 16 byte universal labels. For instance, universal labels are provided for the unique material identifier (UMID) of the essence, title, content producer, episode number, actors, production members, etc.

In addition to the MXF interchange format, the Motion Pictures Experts Group (MPEG) within the International Standards Organization (ISO), is developing a standard called MPEG-7. The MPEG-7 defines a standard for providing metadata on video content that utilizes the Extensible Markup Language (XML) and an XML schema. The XML language uses tags to define, transmit, validate and interpret data. MPEG-7 provides a Description Definition Language (DDL) to allow the creation of description schemes to provide information on video content (essence). Each piece or type of information, referred to as an element, is defined as having a particular structure. The data provided for that particular element is included within the element tags. Thus, there could be a title tag, director tag, lead actor tags, etc. Each element has one or more attributes of that element. For instance, the directory element may have a name attribute providing the name of the directory.

One challenge for data warehousing systems for video content is to design a framework to allow the storage and cataloging of video content that conforms to the MXF, MPEG-7 or any other standard file interchange format, and to utilize the metadata maintained in such MXF and MPEG-7 files to allow for searching and cataloging of the video content in the data warehouse.

SUMMARY OF THE PREFERRED EMBODIMENTS

Provided is a method, system, and program for storing data in a data store. A first file in a first file format is received including essence, metadata objects providing information on the essence, and a unique identifier assigned to the essence. The essence is extracted from the file and stored in the data store. The metadata is extracted from each metadata object in the first file and stored in the data store in a second file format. The extracted metadata and essence in the data store are accessible using the unique identifier assigned to the essence.

In further implementations, storing the extracted metadata in the data store further comprises adding the extracted metadata to a metadata data structure in a second file format, wherein the metadata data structure is stored in the data store.

In still further implementations, adding the extracted metadata to the metadata data structure further comprises storing the metadata extracted from each metadata object in the first file in at least one field in the metadata data structure.

Still further, each metadata object in the first file includes a metadata code corresponding to a metadata type. In such case, storing the extracted metadata from each metadata object in the metadata data structure further comprises providing a mapping associating field types for the second file format with the metadata codes identifying metadata types in the first file format. For each metadata object, a determination is made from the mapping of one field type for the metadata code in the metadata object, wherein one field including the metadata in the metadata data structure indicates the determined field type.

In yet further implementations, the essence data may comprise one of multimedia data, application data, text, and database records. Further, the first file format may comprise the Media Exchange Format (MXF) and the metadata objects in the first file may be implemented in the Key, Length, Value (KLV) coding scheme.

In still further implementations, a unique identifier is received. The essence and the metadata data structure associated with the unique identifier are accessed. At least one reconstructed metadata object is generated from the metadata in the metadata data structure and a second file in the first file format is assembled to include the reconstructed metadata object, the accessed essence, and the received unique identifier.

Described implementations provide a technique for storing essence data and metadata on the essence in a file one file format in a data store, where the metadata is maintained in a second file format accessible to the programs and utilities of the data store.

BRIEF DESCRIPTION OF THE DRAWINGS

Referring now to the drawings in which like reference numbers represent corresponding parts throughout:

FIGS. 8 and 9 illustrate logic implemented in the data warehouse architecture of FIG. 3 to reconstruct a file including essence and metadata in the data warehouse in accordance with implementations of the invention.

DETAILED DESCRIPTION OF THE PREFERRED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

Figure 1:
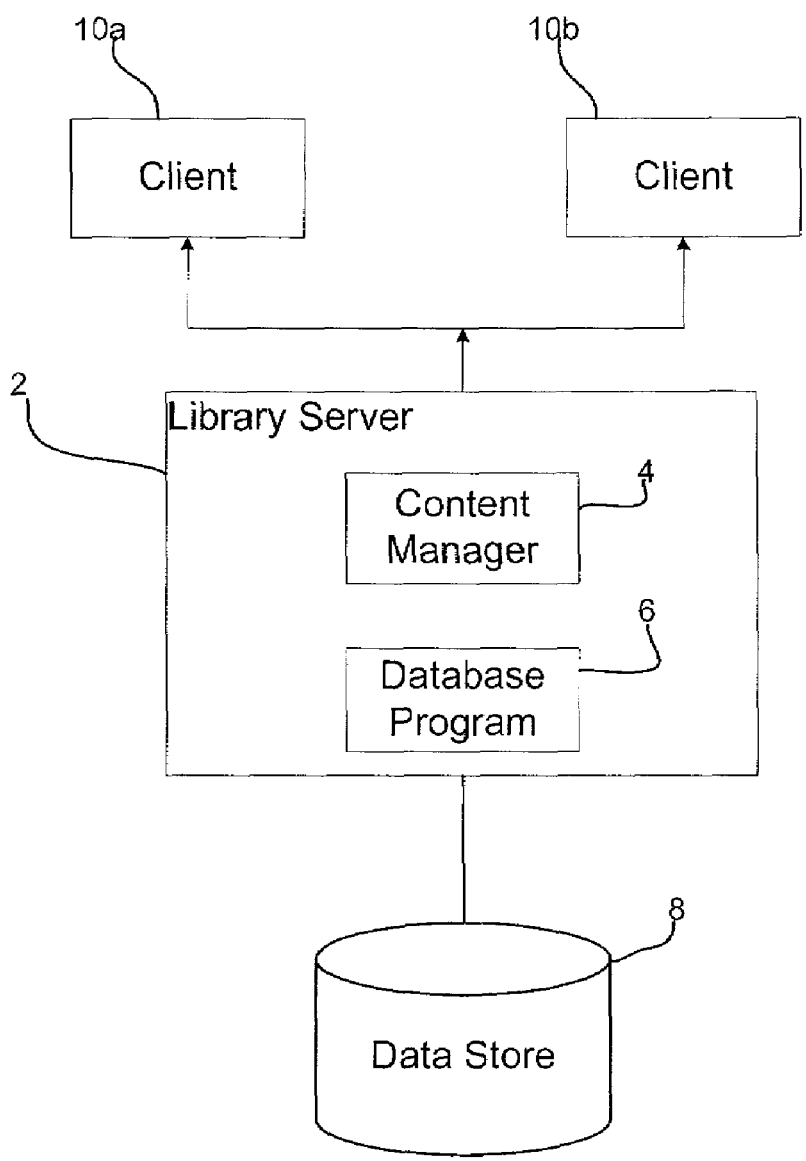
FIG. 1 illustrates components of a data warehouse in which aspects of the invention are implemented.

FIG. 1 illustrates a computing environment in which aspects of the invention are implemented. A library server 2 includes a content manager program 4 and database program 6, e.g., International Business Machines Corporation's (IBM) DB2*, Oracle 8 Server, etc.,** for managing data in a data store 8, which includes a file system and data storage system (e.g., a storage subsystem, Direct Access Storage Device (DASD), etc.) in which the data is included. Client computers 10a . . . 10n may access data in the data store 8 through the library server 2. The content manager program 4 archives and stores data in the data store 8, manages catalog information on the data stored in the data store 8, locates stored objects using the database program 6 to maintain index information and controls access to data objects in the data store 8. Further details of the computing environment of FIG. 1 including a library server 2 and data store 8 are described in the IBM publication "IBM Content Manager for Multi-Platforms: System Administration Guide, Version 7.1", IBM document no. SC27-0868-00 (IBM Copyright, January, 2001), which publication is incorporated herein by reference in its entirety.

IBM, and DB2 are registered trademarks of International Business Machines Corp.

Figure 2A:
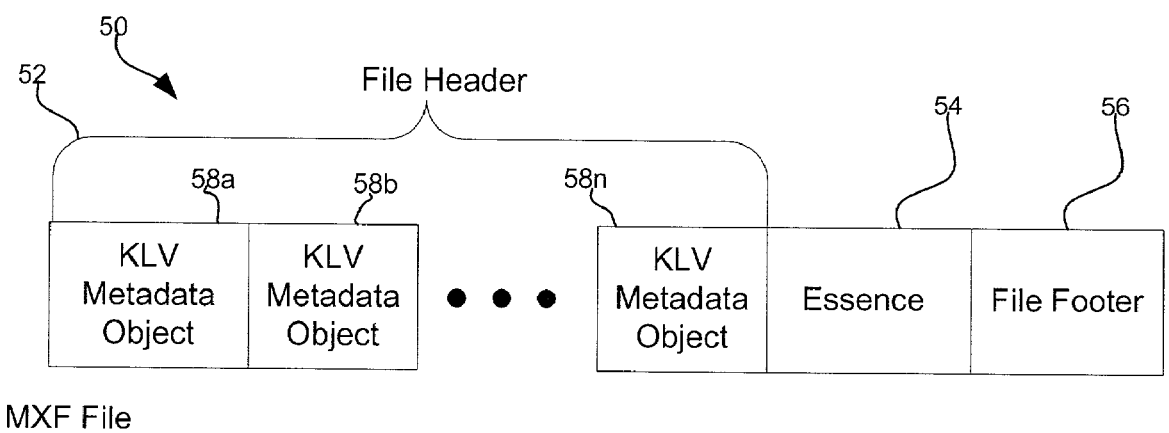
FIGS. 2a and 2b illustrate multi-media file formats known in the prior art that are utilized with implementations of the invention.
Figure 2B:
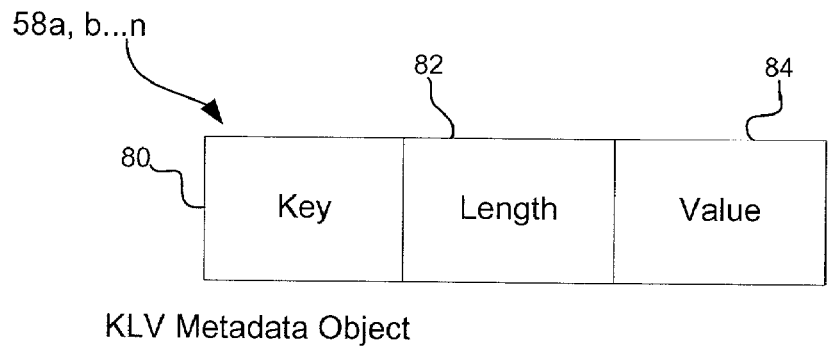

Described implementations provide a technique for storing the data from an MXF file in the data store 8 using the library server 2 and allowing for indexing and searching on the data from the MXF file using the database program 6. FIG. 2a illustrates a data structure of an MXF file 50, as known in the prior art, including a file header 52, essence container 54 including a sequence of the actual video data segments, and a file footer 56 indicating the end of the file, and may include a duplicate copy of the file header 52 metadata. The file header may include fields and data in addition to the fields and data shown in FIG. 2a. FIG. 2b illustrates the data structure format, as known in the prior art, of each KLV object 58a, b . . . n. The key 80 is a unique 16 byte universal label specified in the SMPTE Metadata dictionary that defines a particular type of content, e.g., actor, producer, UMID, distributor, etc. The length 82 indicates the data length of the value 84 for the type of content indicated by the key 80. Additional details of the MXF file format and KLV metadata are described in the publication entitled "Material Exchange Format (MXF): MXF Generic Container Format (Proposed SMPTE Standard)", filename: mxf7b-p5-b1-gc.doc (Jul. 30, 2001) and the "Material Exchange Format (MXF): Format Specification (Proposed SMPTE Standard)", which publications are incorporated herein by reference in their entirety.

Figure 3:
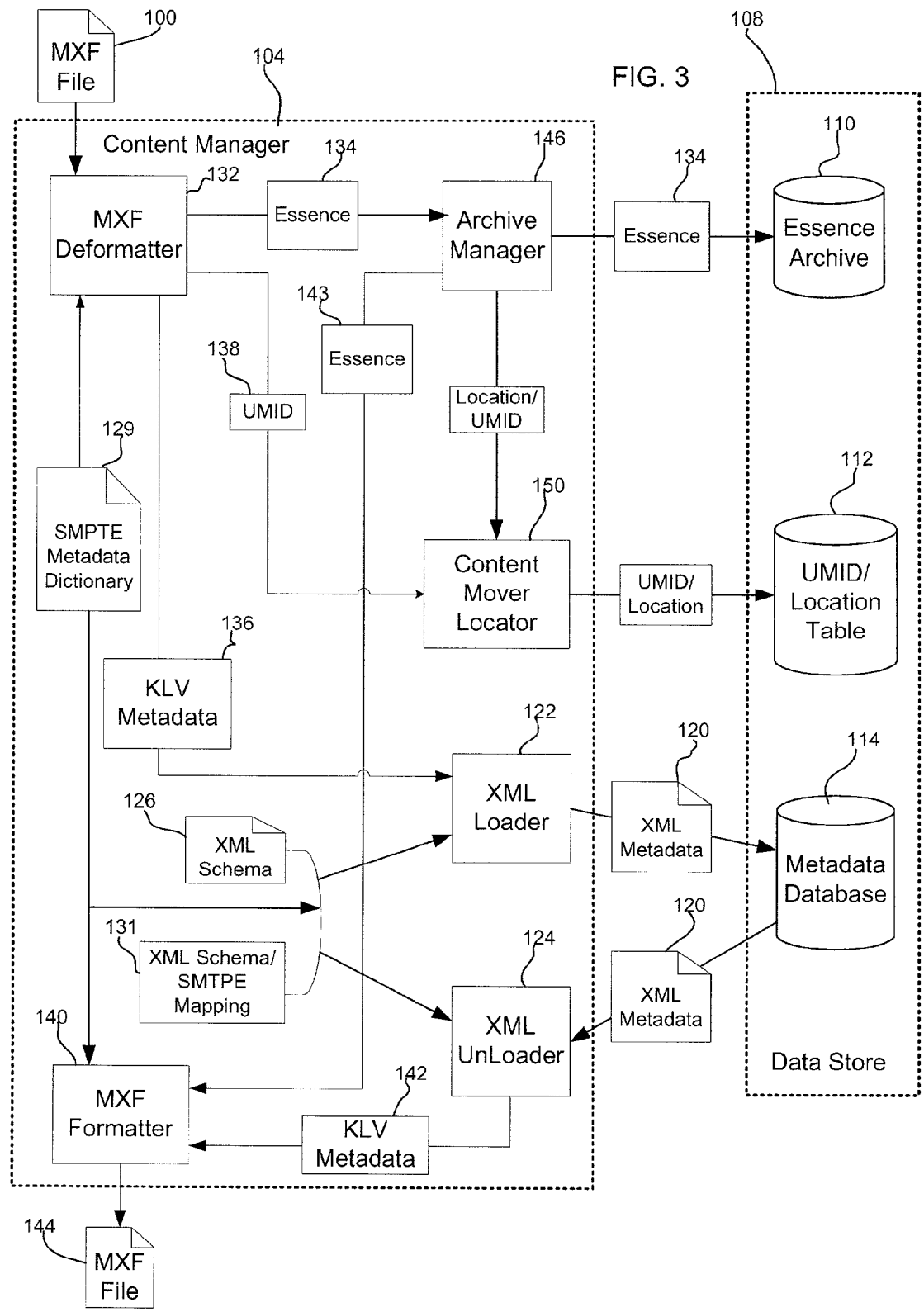
FIG. 3 illustrates a data warehouse architecture in accordance with implementations of the invention.
Figure 4:
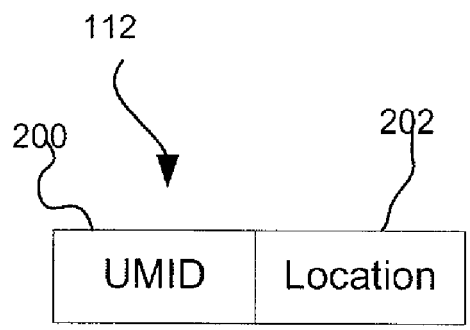
FIG. 4 illustrates a record in a table providing information on data in the data store in accordance with implementations of the invention.

FIG. 3 illustrates the program component architecture within a content manager 104 to transform an MXF file 100, conforming to the MXF standard and including the file components shown in FIG. 2a, to objects for storage in a data store 8. In FIG. 3, the data store 108 includes an essence archive 110 to store the actual video content included in the MXF essence portion 54 of file, a Universal Media Identifier (UMID)/location table 112 that provides the location of the essence in the essence archive 110 having the UMID, and a metadata database 114 including the metadata from the MXF file 100. FIG. 4 provides a format of the fields in the UMID/location table 112, including a key column comprising the UMID 200 included in the MXF file 100 as one of the KLV metadata objects 58a, 58b . . . 58n and a location field 202 indicating the location, i.e., Universal Resource Locator (URL), Universal Resource identifier (URI), etc., in the data store 8 file system of the essence having the UMID in the UMID column 200.

Figure 5:
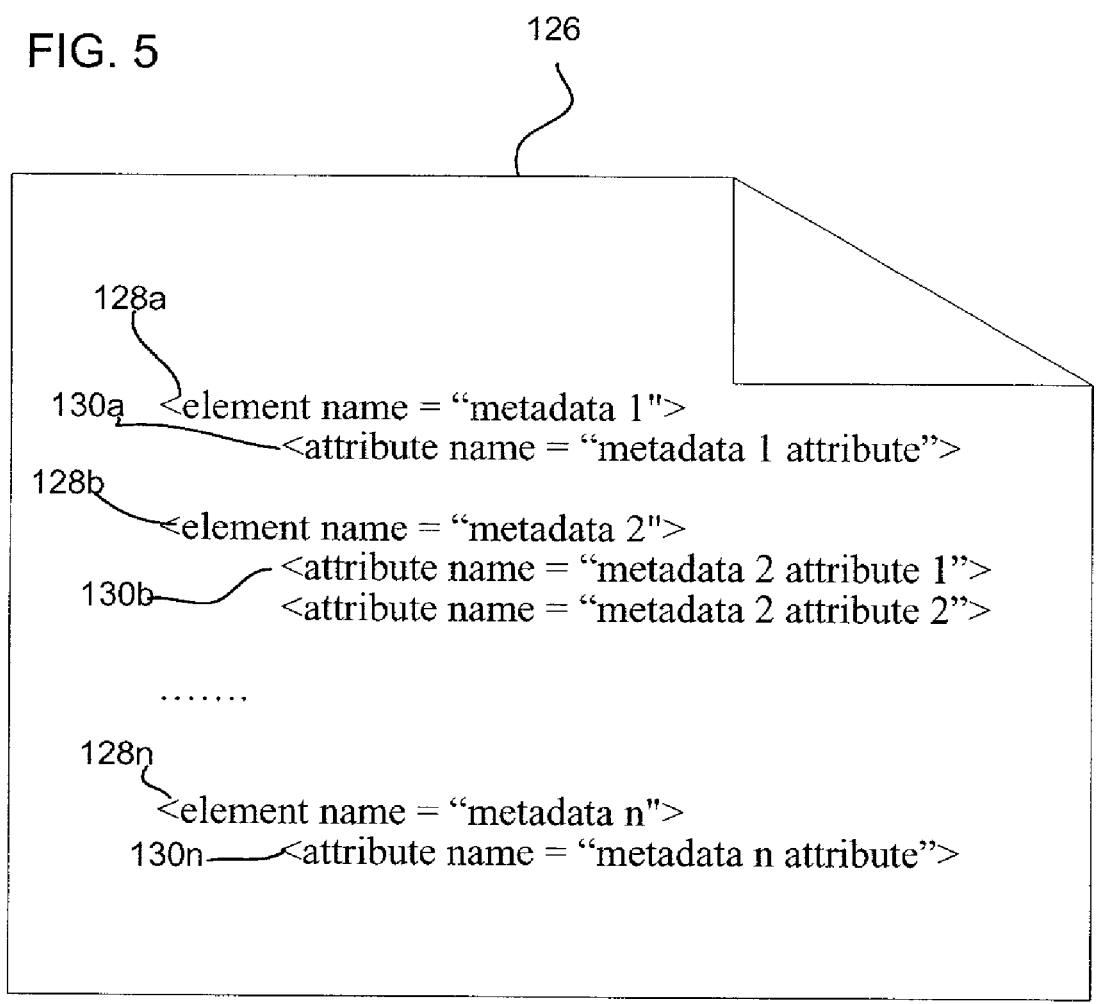
FIG. 5 illustrates an Extensible Markup Language (XML) schema for storing metadata in accordance with implementations of the invention.

In certain implementations, the metadata database 114 includes an XML metadata file 120 for each MXF file 100 for which data is maintained in the data store 8. An XML loader 122 and XML unloader 124 program components are capable of taking the KVL metadata objects 58a, b . . . n (FIG. 2a) and mapping the metadata therein to an XML metadata file 120 that conforms to an XML schema 126, such as an XML schema defined according to the MPEG-7 data description schema. The XML schema defines how tagged elements correspond to the metadata attributes and values. FIG. 5 illustrates an example of an XML schema 126 defined for video content received in the form of the MXF file 100. The XML schema 126 includes metadata elements 128a, 128b . . . 128n, each having one or more defined attributes 130a, 130b . . . 130n. For instance, an actor element may have as attributes a first name attribute, a middle name attribute, and a last name attribute. The XML schema 126 may define metadata elements concerning the creation and production of the content (e.g., title, creator, classification, etc.), usage (e.g., right holders, access rights, etc.), media (e.g., storage format, encoding, etc.), structural aspects (e.g., format of the essence, physical spacial, temporal spacial).

In certain implementations, the tagged elements and attributes defined in the XML schema 126 correspond to the universal label codes set forth in the SMPTE metadata dictionary 129, such as the SMPTE Metadata Dictionary, Version 1.0, July 2000, which is incorporated herein by reference in its entirety. The SMPTE metadata dictionary 129 provides unique universal labels for metadata elements that are either a node or leaf. A metadata type that is a node has values defined by leaf universal labels. For instance, in the SMPTE metadata dictionary 129, there is a universal label node for the title of the content and leaf universal labels providing the actual title values. For instance, there are leaf universal labels for main title, secondary title, series number, episode number, etc. An XML schema mapping 131 provides information on how the SMPTE metadata universal labels map to tagged elements and attributes in the XML schema 126, which may comprise the MPEG-7 XML schema. In certain implementations, each node universal label would map to an element tag in the XML schema 126 and the leaf universal label(s) would map to attribute tags of the element tag of the node universal label for the leaves. For instance, the title node universal label would map to a title element in the XML schema 126, and the title values that are leaf universal labels in the SMPTE metadata dictionary 129 map to attribute tags for the title element.

The content manager 104 further includes an MXF deformatter 132 capable of extracting the essence 134, KLV metadata 136, and UMID 138 from an MXF file 100 and an MXF formatter 140 capable of combining the essence 134 and reconstructed KLV metadata 142 into a reconstructed MXF file 144. An archive manager 146 manages the storage of essence at a location in the essence archive 110 of the data store 108. A content mover locator 150 manages the UMID/Location table 112 that provides an index of locations for UMIDs of MXF files 100 deconstructed by the content manager 104.

Figure 6:
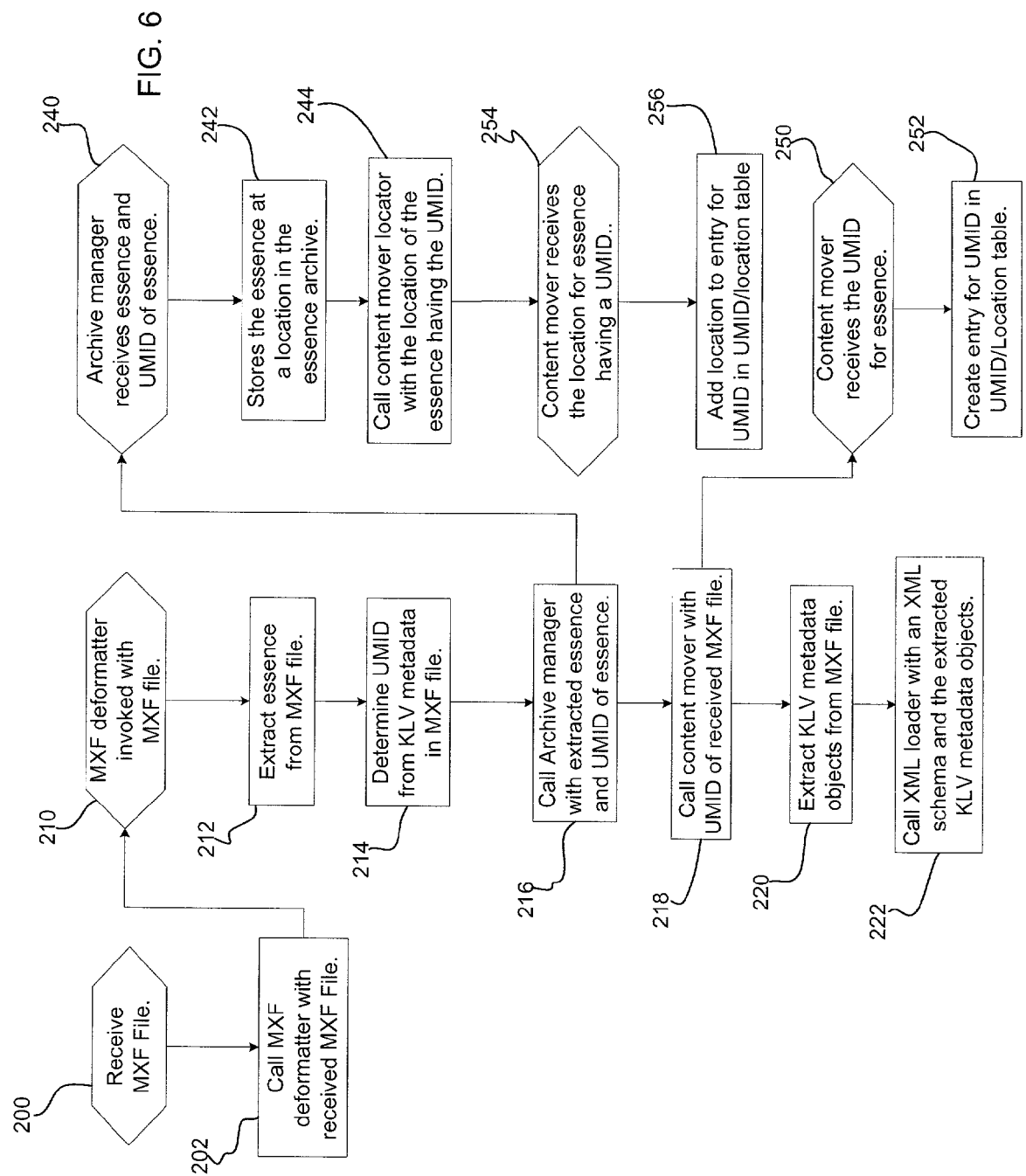
FIGS. 6 and 7 illustrate logic implemented in the data warehouse architecture of FIG. 3 to store essence and metadata from a file in the data warehouse in accordance with implementations of the invention.
Figure 7:
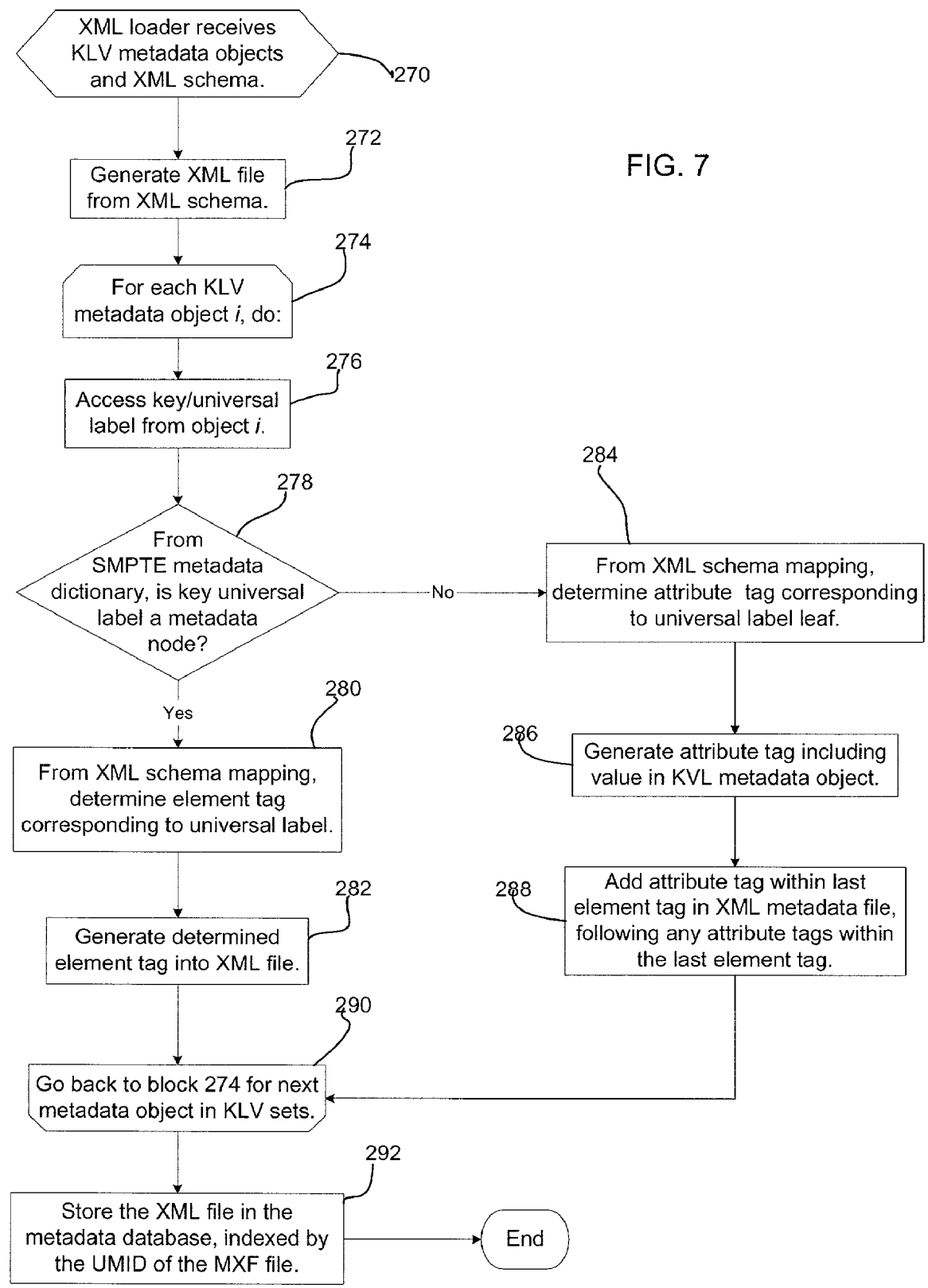

FIGS. 6 and 7 illustrate logic implemented in the program components of the content manager 104 (FIG. 3) to deconstruct the MXF file 100 and store the essence and metadata in the data store 108. With respect to FIG. 6, control begins at block 200 upon receiving the MXF file 100. In response, the MXF deformatter 132 is called with the MXF file 100. Upon receiving (at block 210) the MXF file 100, the MXF deformatter 132 extracts (at block 212) the essence 134 from the essence field 54 (FIG. 2*a*) in the MXF file 100 and determines (at block 214) the UMID from the KLV metadata object providing the UMID, i.e., the universal label for the UMID. The MXF deformatter 132 calls (at block 216) the archive manager 146 to store the extracted essence 134 having the UMID 138 and calls (at block 218) the content mover with the UMID of the received MXF file 200.

In response to the call (at block 240) including the extracted essence 134, or a pointer thereto, the archive manager 148 stores (at block 242) the essence 134 at a location in the essence archive 110 and calls (at block 244) the content mover locator 160. In response to the call (at block 250) with the UMID of the MXF file 100, the content mover locator 160 creates (at block 252) an entry in the UMID/Location table 112 for the received UMID. After storing the essence in the essence archive 110, the archive manager 148 calls (at block 244) the content mover locator 150 with the location of the essence having the UMID. In response to the call (at block 254) including the location of the essence for a UMID, the content mover locator 150 adds (at block 256) the received location of the essence in the essence archive 110 to the UMID/Location table 112 in the entry for the UMID for the location.

The MXF deformatter 132 further extracts (at block 220) the KLV metadata objects 58*a*, 58*b* . . . 58*n* (FIG. 2*a*) from the MXF file 100 and calls (at block 222) the XML loader 122 to add the metadata information to an XML metadata file 120 that is stored in the metadata database 114, and indexed with the UMID 138 of the MXF file 100 that is the source of the metadata.

FIG. 7 illustrates logic implemented in the XML loader 122 component of the content manager 104 to add the metadata in the KVL metadata objects 142 to an XML metadata file 120 that is stored in the metadata database 114. Control begins at block 270 upon receiving the KVL metadata objects 136 from the MXF deformatter 132. In response, the XML loader 122 generates (at block 272) an XML metadata file 120, without actual metadata at this point, from the XML schema 126. For each KLV metadata object i in the received KVL metadata 136, a loop is performed at blocks 274 through 294. The key 80 (FIG. 2*b*) or universal label is accessed (at block 276) from the metadata object i. The XML loader 122 then determines (at block 278), from the SMPTE metadata dictionary 129, whether the accessed universal label is for a metadata node, as opposed to a leaf that provides a value for a node element in the SMPTE metadata dictionary 129. If (at block 278) the accessed universal label is for a metadata node, then the XML loader 122 determines (at block 290) from the XML schema/SMPTE mapping 30 the XML element tag in the XML schema 126 corresponding to the accessed universal label (key 80). An element tag for the determined XML element is then generated (at block 282) into the XML metadata file 120 following the last generated XML tag in the XML metadata file 120.

If (at block 278), the accessed key 80 universal label is for a leaf data element, then the XML loader 122 determines (at block 284) from the XML schema/SMTPE mapping 131 the XML attribute tag in the XML schema 126 corresponding to the accessed universal label. As discussed, a universal label node maps to an element tag and a universal label leaf maps to an attribute tag. An XML attribute tag is generated (at block 286) including the value 84 (FIG. 2*a*) from the KVL metadata object i. The generated attribute tag is then added (at block 288) within the last element tag in the XML metadata file 120, following any other attribute tags having values added with the last element tag. After adding an XML element or attribute tag to the XML metadata file 120 from block 282 or 288, control proceeds (at block 290) back to block 274 to process the next KLV metadata object in the file header 52 (FIG. 2*a*) of the MXF file 100. After adding XML tags to the XML metadata file 126 for all the KLV metadata objects 58*a*, 58*b* . . . 58*n* (FIG. 2*a*) in the received MXF file 100, the XML loader 122 stores (at block 292) the generated XML metadata file 120 in the metadata database 114, indexed by the UMID 138 of the MXF file 100.

With the logic of FIGS. 6 and 7, the content manager 104 transforms an MXF file 100 into an essence 134 component and an XML metadata file 120 including the metadata that was within the KLV metadata objects 58*a*, *b* . . . *n*. This transformation is advantageous because the metadata can be processed as an XML file using XML parsers and other applications designed specifically to handle XML data. For instance, the content manager 104 can utilize XML parsers and search programs to query the XML files 120 in the metadata database 114 for metadata matching a certain search criteria to locate essence 134 associated with such a matching XML metadata file 120.

Figure 9:
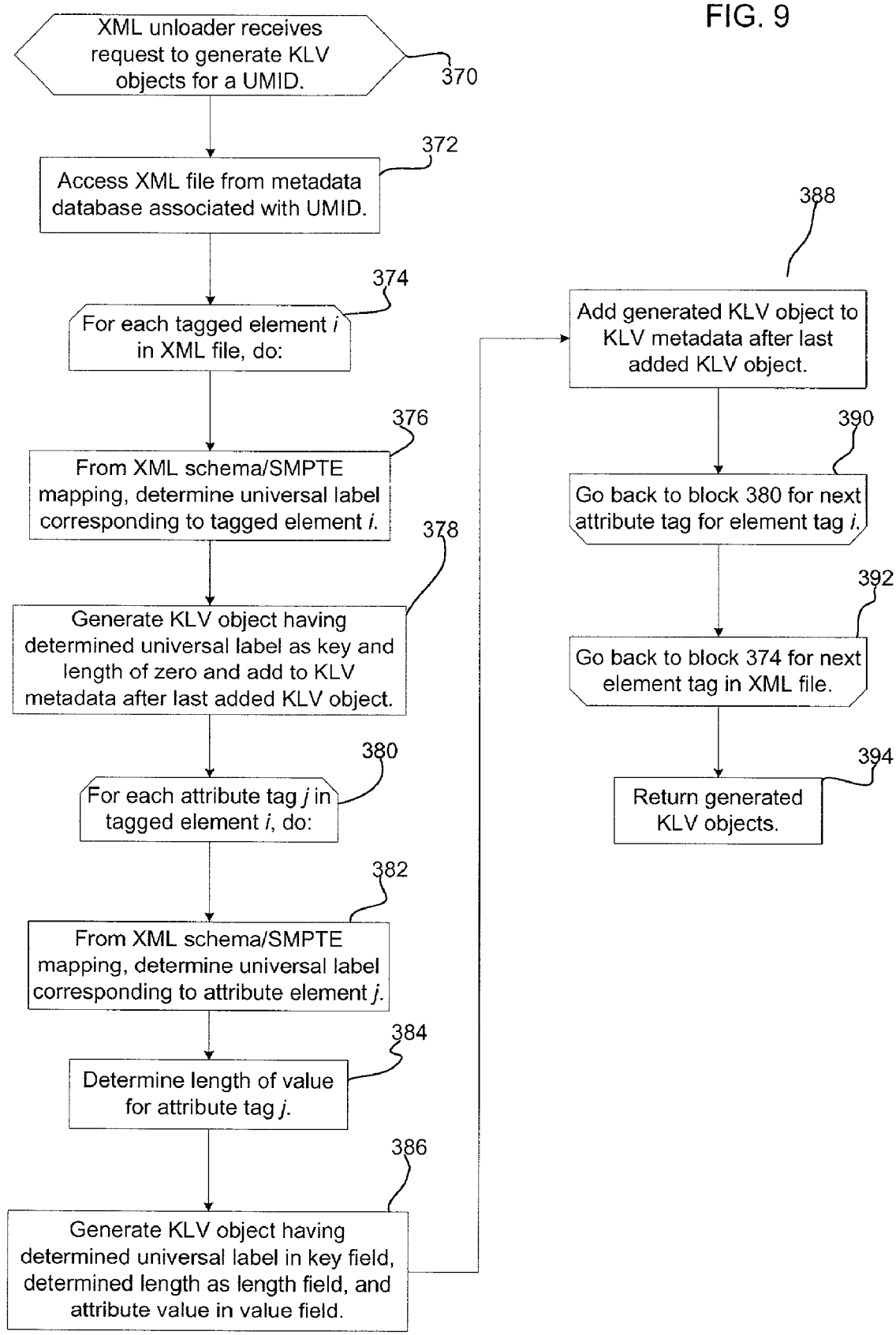

FIGS. 8 and 9 illustrate logic illustrated in the components of the content manager 104 to reconstruct an MXF file 144 from the essence 134 and XML metadata file 120 maintained in the data store 108. With respect to FIG. 8, control begins at block 300 with the content manager 104 receiving a request to reconstruct an MXF file 144 from metadata and essence in the data store 108 having the UMID. The content manager 104 calls (at block 302) the content mover locator 150 to determine the location of the essence having a specified UMID in the essence archive 110. In response to receiving the call (at block 320), the content mover locator 150 queries (at block 322) the UMID/Location table 112 to detetrmine the location of the essence having the UMID and returns (at block 324) the determined location to the calling content manager 104. Upon receiving (at block 303) (the location of the essence for the UMID, the content manager 104 calls (at block 304) the archive manager 146. In response to being invoked (at block 326), the archive manager 146 accesses the essence 152 at the location returned by the content mover locator 150 and returns (at block 330) the essence to the content manager 104. The content manager 104 further calls (at block 306) the XML unloader 120 to generate the KLV metadata objects 142 for the MXF file 144 having the UMID from the XML metadata file 120.

FIG. 9 illustrates logic implemented in the XML unloader 124 to reconstruct KLV metadata objects from the metadata database 114 for a UMID. Upon receiving (at block 370) a request to generate KLV metadata objects for a specified UMID, the XML unloader 124 accesses (at block 372) the XML metadata file 120 from the metadata database 114 associated with the received UMID. As mentioned, the XML metadata files 120 may be indexed in the metadata database 114 according to UMID. The XML unloader 124 performs a loop at blocks 374 through 392 for each XML tagged element i in the XML metadata file 120. In certain implementations, the XML unloader 124 would include an XML parser to scan and parse XML statements in the XML metadata file 120. At block 376, the XML unloader 124 processes the XML schema/SMPTE mapping 131 to determine the universal label in the SMPTE metadata dictionary 129 corresponding to the tagged element i. A KLV metadata object 58a, 58b . . . 58n (FIG. 2a) is then generated (at block 378) having the determined universal label as a key 80 (FIG. 2b) and a length 82 of zero. The created KLV metadata object is then added to the KLV metadata 142 following the last added KLV object.

The XML unloader 124 then performs an inner loop at blocks 380 through 390 for each attribute tag j for the element tag i, where the attribute tag j provides an attribute value for the element, e.g., an actor's name, content title, etc. At block 382, the XML unloader 124 determines from the XML schema/SMPTE mapping 131, the universal label in the SMPTE metadata dictionary 129 corresponding to attribute element j. The length of the value in the attribute tag j is determined (at block 384). The XML unloader 124 then generates a KLV metadata object 58a, b . . . n having the determined universal label in the key 80 (FIG. 2b) field, the determined length in the length 82 field, and the attribute value in attribute tag j in the value field 84. The generated KLV object 58a, b . . . n is then added to the KLV metadata 142 following the last added KLV object. At block 390, control proceeds back to block 380 to process any further attribute tags for element tag i. After adding KLV metadata objects for all the attribute tags for element tag i, control proceeds (at block 392) back to block 374 to consider the next XML tagged element in the XML metadata file 120. The generated KLV metadata objects 58a, b . . . n are then returned (at block 394) to the content manager 104.

With respect to FIG. 8, at block 308, the content manager 104 receives the essence 143 from the archive manager 146 and the generated KLV metadata 142 from the XML unloader 124 and, in response, calls (at block 310) the MXF formatter 140 with the received essence 143 and the reconstructed KLV metadata objects 142. In response, the MXF formatter 140 generates (at block 342) a file header 52 (FIG. 2a) for the MXF file 144. The MXF formatter 140 further inserts (at block 344) KLV metadata objects 142 into the file header 42, adds (at block 346) the essence 143 into the MXF file 144 following the file header 50, and inserts (at block 348) a file footer 56 into the MXF file 144 following the essence. The MXF formatter 140 then returns (at block 350) the generated MXF file 144.

The described implementations provide a technique for deconstructing a file including metadata and content for storage in a data store in a format compatible with the content manager for the data store. Further provided is a technique for reconstructing the file according to the information from the deconstructed file maintained in the data store.

Additional Implementation Details

The preferred embodiments may be implemented as a method, apparatus or article of manufacture using standard programming and/or engineering techniques to produce software or code. The term "article of manufacture" as used herein refers to code or logic implemented in a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art.

In the described implementations, the MXF file was described as including particular fields. In certain implementations, the MXF file may include additional data and may store essence data in a different format. In such implementations, the content manager 104 and components therein would have to process such additional data in the MXF file. During MXF file deconstruction, some of the additional data in the MXF file may be stored in the data store 8 for use when reconstructing the MXF file from the essence and metadata in the data store 8.

In the described implementations, metadata and content were extracted from a file in the MXF file format for storage in the data store. In alternative implementations, the file subject to deconstruction and construction may be in formats other than MXF for storing content and metadata on the content. In yet further alternative environments, the metadata and content may be extracted from a file that is in a same file format in which the content and metadata is stored in the data store.

In the described implementations, the metadata in the MXF file was stored in an XML file for the metadata in the data store. In alternative implementations, the metadata extracted from the source/MXF file may be stored in files or data structures other than an XML file.

In described implementations, the metadata type used in the metadata objects was defined according to an SMPTE metadata dictionary. In non-MXF file formats, the metadata type may be defined in a manner different from the coding used in the SMPTE metadata dictionary.

In the described implementations, the essence comprised multi-media content, such as digital video and audio content. Additionally, the essence may comprise any type of multi-media or data types other than multi-media data, such as application data, text files, etc.

In the described implementation, a separate XML metadata file was provided for each MXF file to include in the data store. In alternative implementations, the data in the XML metadata file may be stored in alternative data structures other than a separate XML file for each MXF file and UMID. For instance, one XML file may be used to store the XML metadata for multiple UMIDs, or the XML metadata may be maintained in an alternative data structure such as a database.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for storing data in a data store, comprising:
    receiving a multimedia file in a first file format including essence, metadata objects providing information on the essence, and a unique identifier assigned to the essence;
    extracting the essence from the multimedia file;
    storing the essence in the data store;
    generating a metadata file in a second file format by performing for each received metadata object in the received multimedia file:
        (i) determining whether the metadata object includes a label or attribute of a label;
        (ii) adding a tagged element to the metadata file corresponding to the label if the metadata object includes one label; and
        (iii) adding a tagged attribute to the metadata file if the metadata object includes one attribute for one label, wherein the tagged attribute indicates an attribute value for one tagged element corresponding to the label for which the value is provided;
    storing the metadata file in the data store; and
    using the unique identifier to access the essence and the metadata file in the data store.

2. The method of claim 1, wherein one separate metadata file including tagged elements and attributes is generated for each received multimedia file.

3. The method of claim 1, wherein the essence data comprises one of multimedia data, application data, text, and database records.

4. The method of claim 3, wherein the multimedia file conforms to the Media Exchange Format (MXF) and wherein the metadata objects in the multimedia file are implemented in the Key, Length, Value (KEY) coding scheme.

5. The method of claim 1, further comprising:
    receiving a unique identifier;
    accessing the essence and the metadata file associated with the unique identifier;
    generating one reconstructed metadata object for each tagged element and attribute in the metadata file; and
    assembling a reconstructed multimedia file including the reconstructed metadata objects, the accessed essence, and the received unique identifier.

6. The method of claim 5, wherein generating each reconstructed metadata object further comprises:
    accessing the metadata from one tagged element or attribute in the metadata file; and
    storing the accessed metadata in the reconstructed metadata object for the tagged element or attribute.

7. The method of claim 6, wherein generating each reconstructed metadata object further comprises:
    providing a mapping associating tagged elements and attributes with labels;
    determining from the mapping the label corresponding to the tagged element or attribute; and
    including the determined label in the reconstructed metadata object for the tagged element or attribute.

8. The method of claim 7, wherein generating the reconstructed metadata object for one tagged attribute further comprises:
    accessing a metadata attribute value from the tagged attribute; and
    adding the accessed attribute value to the reconstructed metadata object.

9. The method of claim 1, wherein the label or attribute of the label in the metadata object comprises a universal label defined in a metadata dictionary.

10. The method of claim 9, wherein determining whether the metadata object indicates a label or attribute of a label comprises:
    processing the metadata dictionary to determine whether the universal label in the metadata object comprises a node having values defined by leaf universal labels or the leaf of one node, wherein universal labels comprising nodes map to tagged elements and universal labels comprising leafs map to tagged attributes for one tagged element.

11. The method of claim 1, further comprising:
    reconstructing a multimedia file in the first file format including the essence stored in the data store and a metadata object having information on the essence, wherein the metadata object is reconstructed from the metadata file having information on the essence.

12. A system for storing data, comprising:
    a data store;
    means for receiving a multimedia file in a first file format including essence, metadata objects providing information on the essence, and a unique identifier assigned to the essence;
    means for extracting the essence from the multimedia file;
    means for storing the essence in the data store;
    means for generating a metadata file in a second file format by performing for each metadata object in the multimedia file:
        (i) determining whether the metadata object includes a label or attribute of a label;
        (ii) adding a tagged element to the metadata file corresponding to the label if the metadata object includes one label; and
        (iii) adding a tagged attribute to the metadata file if the metadata object includes one attribute for one label, wherein the tagged attribute indicates an attribute value for one tagged element corresponding to the label for which the value is provided;
    means for storing the metadata file in the data; and
    means for using the unique identifier to access the essence and the metadata file in the data store.

13. The system of claim 12, wherein one separate metadata file including tagged elements and attributes is generated for each received multimedia file.

14. The system of claim 12, wherein the essence data comprises one of multimedia data, application data, text, and database records.

15. The system of claim 14, wherein the multimedia file conforms to the Media Exchange Format (MXF) and wherein the metadata objects in the multimedia file are implemented in the Key, Length, Value (KLV) coding scheme.

16. The system of claim 12, further comprising:
means for receiving a unique identifier;
means for accessing the essence and the metadata file associated with the unique identifier;
means for generating one reconstructed metadata object for each tagged element and attribute in the metadata file; and
means for assembling a reconstructed multimedia file including the reconstructed metadata objects, the accessed essence, and the received unique identifier.

17. The method of claim 16, wherein the means for generating each reconstructed metadata object further performs:
accessing the metadata data from one tagged element or attribute in the metadata file; and
storing the accessed metadata in the reconstructed metadata object for the tagged element or attribute.

18. The system of claim 17, wherein the means for generating each reconstructed metadata object further performs:
providing a mapping associating tagged elements and attributes with labels;
determining from the mapping the label corresponding to the tagged element or attribute; and
including the determined label in the reconstructed metadata object for the tagged element or attribute.

19. The system of claim 18, wherein the means for generating the reconstructed metadata object for one tagged attribute further performs:
accessing a metadata attribute value from the tagged attribute; and
adding the accessed attribute value to the reconstructed metadata object.

20. The system of claim 12, wherein the label or attribute of the label in the metadata object comprises a universal label defined in a metadata dictionary.

21. The system of claim 20, wherein determining whether the metadata object indicates a label or attribute of a label comprises:
processing the metadata dictionary to determine whether the universal label in the metadata object comprises a node having values defined by leaf universal labels or the leaf of one node, wherein universal labels comprising nodes map to tagged elements and universal labels comprising leafs map to tagged attributes for one tagged element.

22. The system of claim 12, further comprising:
means for reconstructing a multimedia file in the first file format including the essence stored in the data store and a metadata object having information on the essence, wherein the metadata object is reconstructed from the metadata file having information on the essence.

23. An article of manufacture including code for storing data in a data store, wherein the code is capable of causing operations to be performed comprising:
receiving a multimedia file in a first file format including essence, metadata objects providing information on the essence, and a unique identifier assigned to the essence;
extracting the essence from the multimedia file;
storing the essence in the data store;
generating a metadata file in a second file format by performing for each received metadata object in the received multimedia file:

(i) determining whether the metadata object includes a label or attribute of a label;
(ii) adding a tagged element to the metadata file corresponding to the label if the metadata object includes one label; and
(iii) adding a tagged attribute to the metadata file if the metadata object includes one attribute for one label, wherein the tagged attribute indicates an attribute value for one tagged element corresponding to the label for which the value is provided;
storing the metadata file in the data store; and
using the unique identifier to access the essence and the metadata file in the data store.

24. The article of manufacture of claim 23, wherein one separate metadata file including tagged elements is generated for each received multimedia file.

25. The article of manufacture of claim 23, wherein the essence data comprises one of multimedia data, application data, text, and database records.

26. The article of manufacture of claim 25, wherein the multimedia file conforms to the Media Exchange Format (MXF) and wherein the metadata objects in the multimedia file are implemented in the Key, Length, Value (KLV) coding scheme.

27. The article of manufacture of claim 23, further comprising:
receiving a unique identifier;
accessing the essence and the metadata file associated with the unique identifier;
generating one reconstructed metadata object for each tagged element and attribute in the metadata file; and
assembling a reconstructed multimedia file including the reconstructed metadata objects the accessed essence, and the received unique identifier.

28. The article of manufacture of claim 27, wherein generating each reconstructed metadata object further comprises:
accessing the metadata from one tagged element or attribute in the metadata file; and
storing the accessed metadata in the reconstructed metadata object for the tagged element or attribute.

29. The article of manufacture of claim 28, wherein generating each reconstructed metadata object further comprises:
providing a mapping associating tagged elements and attributes with labels;
determining from the mapping the label corresponding to the tagged element or attribute; and
including the determined label in the reconstructed metadata for the tagged element or attribute.

30. The article of manufacture of claim 29, wherein generating the reconstructed metadata object for one tagged attribute farther comprises:
accessing a metadata attribute value from the tagged attribute; and
adding the accessed attribute value to the reconstructed metadata object.

31. The article of manufacture of claim 23, wherein the label or attribute of the label in the metadata object comprises a universal label defined in a metadata dictionary.

32. The article of manufacture of claim 31, wherein determining whether the metadata object indicates a label or attribute of a label comprises:
processing the metadata dictionary to determine whether the universal label in the metadata object comprises a node having values defined by leaf universal labels or the leaf of one node, wherein universal labels comprising nodes map to tagged elements and universal labels comprising leafs map to tagged attributes for one tagged element.

33. The article of manufacture of claim 23, wherein the operations further comprise:

reconstructing a multimedia file in the first file format including the essence stored in the data store and a metadata object having information on the essence, wherein the metadata object is reconstructed from the metadata file having information on the essence.

* * * * *